United States Patent
Chen et al.

(10) Patent No.: US 10,257,440 B2
(45) Date of Patent: Apr. 9, 2019

(54) VIDEO MATRIX CONTROLLER

(71) Applicant: ATEN International Co., Ltd., New Taipei (TW)

(72) Inventors: Yi-Jen Chen, New Taipei (TW); Shih-Jung Huang, New Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 0 days.

(21) Appl. No.: 15/714,432

(22) Filed: Sep. 25, 2017

(65) Prior Publication Data

US 2018/0091742 A1  Mar. 29, 2018

(30) Foreign Application Priority Data

Sep. 26, 2016  (TW) .............................. 105214732 U

(51) Int. Cl.
*H04N 5/268* (2006.01)

(52) U.S. Cl.
CPC .................................... *H04N 5/268* (2013.01)

(58) Field of Classification Search
CPC ............................. G09G 3/3406; H04N 5/268
USPC ........................................................ 345/102
See application file for complete search history.

(56) References Cited

U.S. PATENT DOCUMENTS

2008/0180414 A1* 7/2008 Fung .................... G09G 3/3426
345/204

FOREIGN PATENT DOCUMENTS

TW  M516205 U  1/2016

* cited by examiner

*Primary Examiner* — Jefferey F Harold
*Assistant Examiner* — Sihar A Karwan
(74) *Attorney, Agent, or Firm* — Chen Yoshimura LLP

(57) ABSTRACT

A video matrix controller, including a receiving module, a matrix switch module and a transmission module. The matrix switch module is coupled between the receiving module and the transmission module. The receiving module includes a first port interface and a first transceiver. The first port interface receives image data and converts it to a signal, and transmits it to the first transceiver. The transmission module includes a second transceiver and a second port interface. The signal is transmitted from the first transceiver to the matrix switch module. The second transceiver receives the signal, and the second port interface converts the signal to image data and transmits it to a corresponding external display device.

12 Claims, 3 Drawing Sheets

VIDEO MATRIX CONTROLLER

BACKGROUND OF THE INVENTION

Field of the Invention

This invention relates to a video controller, and in particular, it relates to a video matrix controller.

Description of Related Art

With the rapid development of new technologies, information technology is changing people's lifestyle. Today, various types of video apparatus apply technology, network and their combination to make image display technologies more diverse, and image resolution is also greatly improved, so that image display methods help consumer to change their visual impression of products.

Matrix display devices are widely used for outdoor display such as on the streets. They use multiple display devices arranged in X*X or X*Y video matrices (also called TV walls). The display devices can receive the same image, or, an original image can be divided into X*X or X*Y sub-images, and the sub-images are transmitted to the corresponding display device in a predetermined correspondence order. This way, although the individual display devices receive different sub-images, by simultaneous display of the multiple display devices, the original image is enlarged and displayed on the video matrix, to attract consumer's attention.

In conventional technology, the original image is divided and transmitted to corresponding display devices by a video matrix control device (such as a controller, switch, distributor, converter, etc.). Conventional video matrix control devices have the following disadvantages: The connection between the receiving end and the transmitting end is one-to-one; for a large scale matrix system, such as 32*32, the number of components and their wiring are increased. As a result, the wiring is complex, the wire cost is increased, and the size of the control device is increased. It also increases repair complexity and cost. Also, one-to-one wiring cannot support cross-screen picture-in-picture (PIP) display and other extended applications. In other words, conventional TV wall mode cannot achieve cross-screen PIP display.

To solve various problems of the conventional technology, it is desired to simplify the internal structure of the control devices, reduce the number of internal components and wiring, reduce the size of the control device, and expand applications of the control device, for example to achieve PIP in cross-screen mode.

SUMMARY

Accordingly, the present invention is directed to a video matrix control apparatus that substantially obviates one or more of the problems due to limitations and disadvantages of the related art. The video matrix control apparatus includes a plurality of receiving modules, a matrix switch module, and a plurality of transmission modules. Each receiving module includes a plurality of first port interfaces and a first transceiver element; each first port interface is configured to receive an image data and convert it to a respective signal. The plurality of first port interfaces are coupled to the first transceiver element, where the signals from the plurality of first port interfaces are transmitted to the first transceiver element. The first transceiver elements of the plurality of receiving modules are coupled to the matrix switch module, and the signals are transmitted to the matrix switch module via the first transceiver elements. The plurality of transmission modules are coupled to the matrix switch module, each transmission module including a second transceiver element and a plurality of second port interfaces. Each of the second transceiver element is coupled to the matrix switch module, configured to receive a plurality of the signals. The plurality of second port interfaces are coupled to the second transceiver element, each second port interface configured to convert a respective one of the signals to a corresponding image data, and to transmit the image data to a corresponding external display device.

To achieve the above object, the number of link pairs between each first transceiver element and the matrix switch module is M, the number of link pairs between each second transceiver element and the matrix switch module is N, and N is greater than M. More specifically, N/M=8.

To achieve the above object, the number of link pairs between each receiving module and the matrix switch module is M, the number of link pairs between each transmission module and the matrix switch module is N, and N is greater than M. More specifically, N/M=8.

To achieve the above object, the first transceiver elements and the second transceiver elements are field-programmable gate arrays (FPGA), and the matrix switch module includes a crosspoint switch.

To achieve the above object, the video matrix control device further includes a streaming module, coupled to the transmission modules and the matrix switch module, for capturing images from the transmission modules. The streaming module is configured to be coupled to a computer for displaying the captured images on a display of the computer. In another aspect, the present invention provides a video matrix control device system, which includes a processing unit, a memory, a receiving module, a matrix switch module, and a transmission module. The receiving module, the matrix switch module and the transmission module are coupled to the processing unit. The receiving module includes a plurality of first port interfaces and a first transceiver element, where the plurality of first port interfaces are coupled to the first transceiver element. The transmission module includes a plurality of second port interfaces and a second transceiver element, where the plurality of second port interfaces are coupled to the second transceiver element.

To achieve the above objects, the matrix switch module is coupled between the receiving module and the transmission module. The number of link pairs between the receiving module and the matrix switch module is M, the number of link pairs between the transmission module and the matrix switch module is N, and N is greater than M.

These drawings and the following detailed descriptions are indented to explain the above aspects and advantages of embodiments of the present invention.

DETAILED DESCRIPTION OF PREFERRED EMBODIMENTS

Preferred embodiments of the present invention are described below. These description explains implementation details of the embodiments, to allow the reader to understand the embodiments. However, those skilled in the relevant art would appreciate that the invention may be implemented without some of the details. Further, for purposes of clarity and brevity, well known structures and functions are not described in detail. The terminology used in the following descriptions should be given the broadest reasonable interpretation, even when they are used to describe details of the embodiments.

Figure 1:
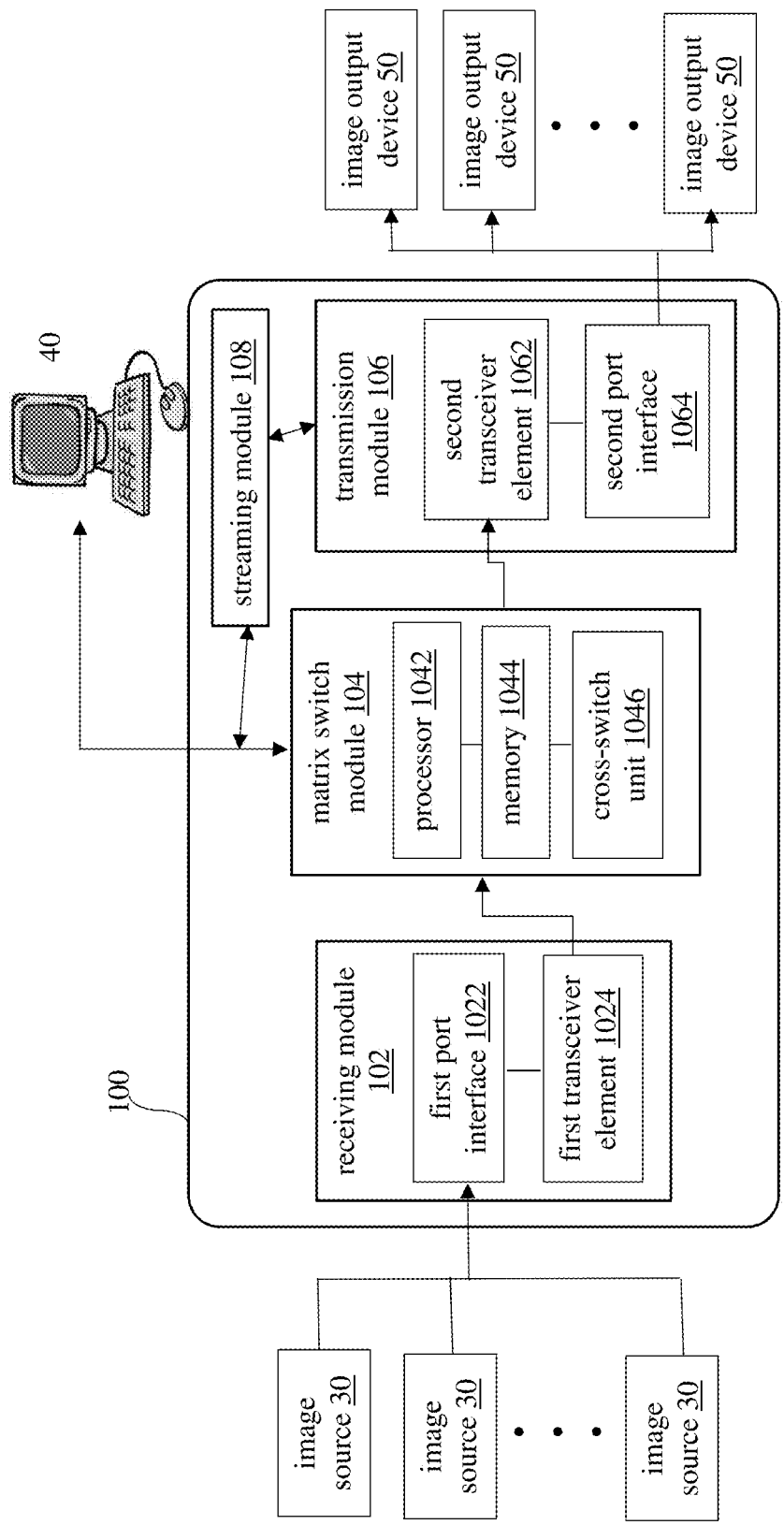
FIG. 1 is a block diagram which illustrates a first embodiment of the present invention.

Refer to FIG. 1, which is a block diagram showing the structure of a video matrix control device 100 (referred to as device 100) according to a first embodiment. In practical applications, the device 100 is disposed between multiple image sources 30 and multiple image output devices 50 (i.e. the video matrix apparatus). In other words, the device 100 can be coupled to multiple different image sources (such as multimedia players, Blu-ray players, etc.), and also coupled to multiple different image output devices (such as a video matrix apparatus). Further, the device 100 can be coupled to a remote electronic device 40, to allow remote operators to use the remote electronic device 40 to control the video matrix system, as shown in FIG. 1.

In one embodiment, the device 100 includes at least one receiving (RX) module 102, at least one transmission (TX) module 106 and a matrix switch module 104. The matrix switch module 104 is coupled between the receiving module 102 and the transmission module 106. Each receiving module 102 includes multiple first port interfaces (RX PHY) 1022 and a first transceiver element (FPGA) 1024. The multiple first port interfaces 1022 are all coupled to the one first transceiver element 1024. Each first port interface 1022 respectively receives image data from an image source 30, converts the image data to a corresponding signal, and transmits the signal to the first transceiver element 1024. The signal may be one of transition-minimized differential signaling (TMDS) format signal, low-voltage differential signaling (LVDS) format signal, serializer/deserializer (SerDes) format signal, transistor-to-transistor logic (TTL) format signal, or mobile high-definition link (MHL) format signal, etc.

In one embodiment, the first transceiver elements 1024 of multiple receiving modules 102 are all coupled to the matrix switch module 104, and each signal is transmitted to the matrix switch module 104 via the corresponding first transceiver element 1024 of the receiving module 102.

In one embodiment, each transmission module 106 includes multiple second port interfaces (RX PHY) 1064 and a second transceiver element (FPGA) 1062. The second port interfaces 1064 are all coupled to the one second transceiver element 1062. The second transceiver element 1062 is coupled to the matrix switch module 104 to receive multiple signals. The second port interfaces 1064 respectively convert the multiple signals back to the multiple original image data, and transmit them to the corresponding multiple external display devices (i.e. image output devices 50).

The matrix switch module 104 includes a processor 1042, a memory 1044 and a cross-switch unit 1046. The cross-switch unit 1046 is coupled to the processor 1042 and memory 1044. In one embodiment, the cross-switch unit 1046 may be a crosspoint switch, a FPGA (field-programmable gate array), or shunts combined with a switch. In one embodiment, the number of link (or line) pairs between each first transceiver element 1024 and the matrix switch module 104 is M, and the number of link (or line) pairs between each second transceiver element 1062 and the matrix switch module 104 is N, where N is greater than M.

Figure 2:
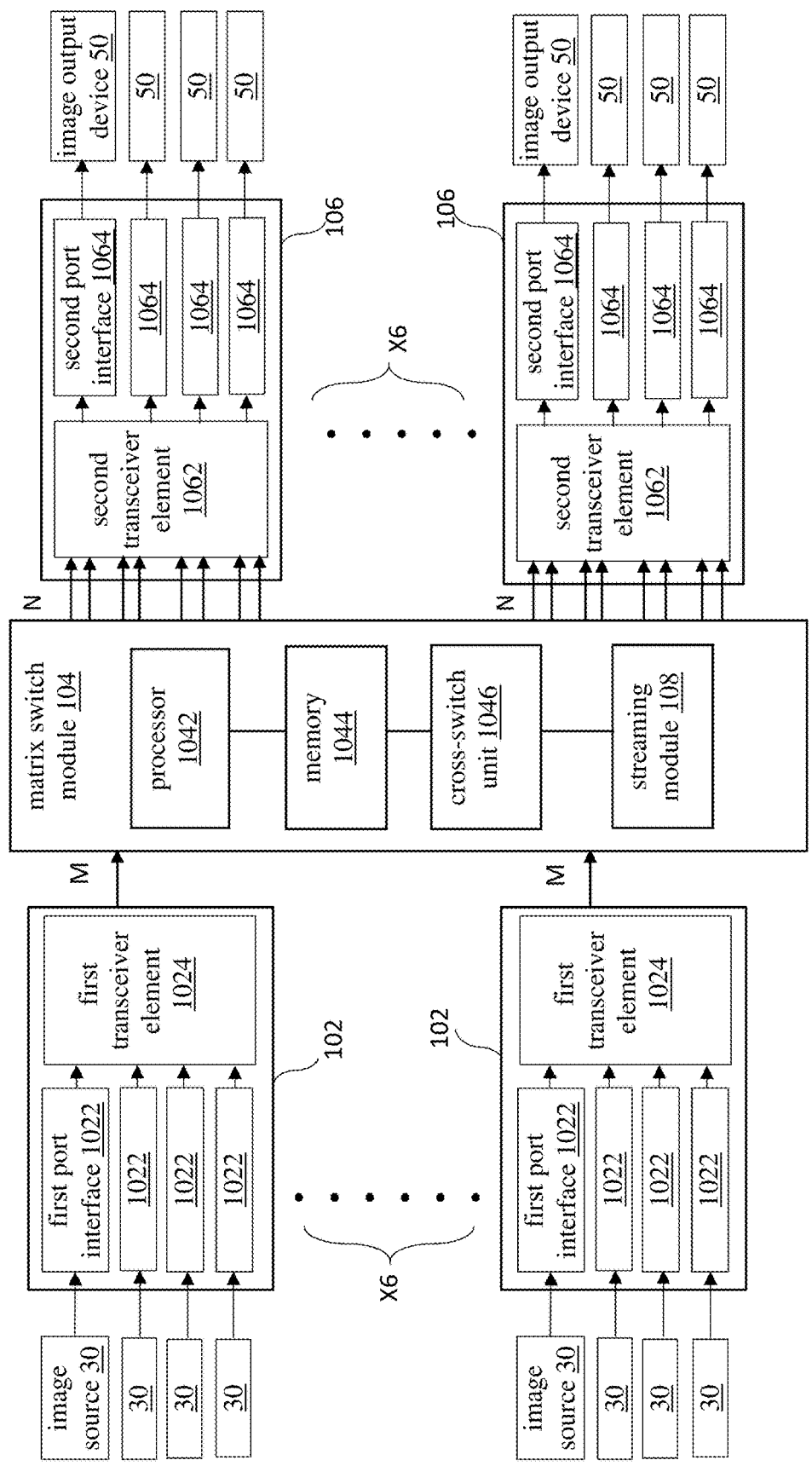
FIG. 2 is another block diagram which illustrates the first embodiment of the present invention.

For example, refer to FIG. 2, which illustrates a preferred embodiment of the present invention. This embodiment uses TMDS signal as an example to illustrate the implementation. The matrix switch module 104 is coupled to eight receiving modules 102 on one side. To avoid overcrowding, the figure only shows two of them and the other six are not shown. Each receiving module 102 includes four first port interfaces 1022 and one first transceiver element 1024, and each first port interface 1022 is coupled to a respective image source. Thus, on the left-hand side of FIG. 2, a total of thirty-two image sources can be coupled. These image sources may be the same or different. On the right-hand side of FIG. 2, the other side of the matrix switch module 104 is coupled to eight transmission modules 106. To avoid overcrowding, the figure only shows two of them and the other six are not shown. Each transmission module 106 includes four second port interfaces 1064 and one second transceiver element 1062, and each second port interface 1064 is coupled to a respective image output device 50. Between each receiving module 102 and the matrix switch module 104, there is one pair of link, i.e., M=1. Between each transmission module 106 and the matrix switch module 104, there are eight pairs of links, i.e., N=8, so N is greater than M. Those skilled in the art should appreciate that the invention is not limited to the configuration shown in FIG. 2, and the values of M and N are not limited to the above example, but can be adjusted based on practical need, so long as the values of N and M meet the condition that N is greater than M. This way, the one-to-one wiring within conventional control devices is not needed, and wiring can be simplified.

In one embodiment, as shown in FIG. 1, the device 100 further includes a streaming module 108, coupled to the processor 1042 and the transmission modules 106, for capturing images from the transmission modules 106 and transmitting them to the remote electronic device 40.

Figure 3:
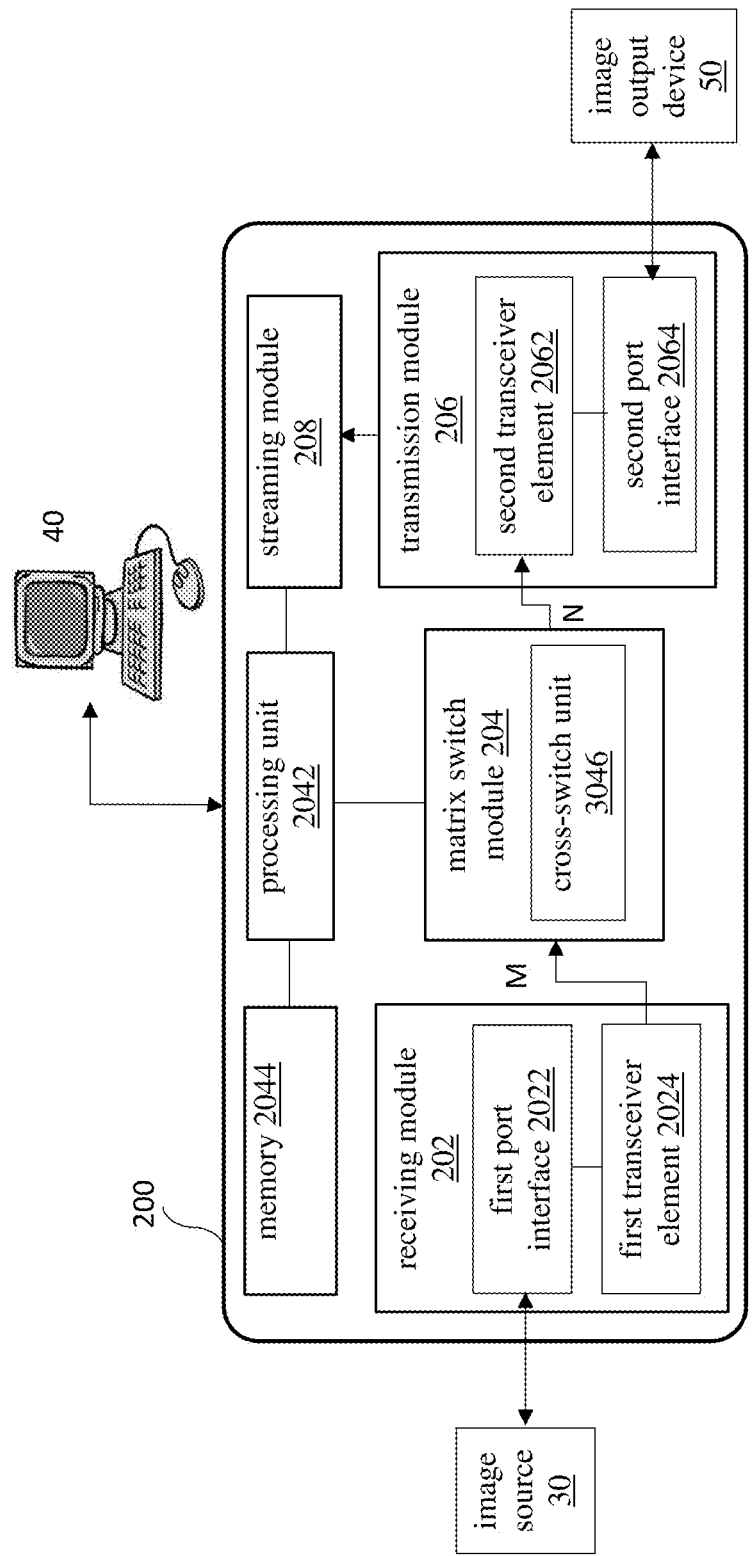
FIG. 3 is a block diagram which illustrates a second embodiment of the present invention.

Refer to FIG. 3, which illustrates the architecture of a video matrix control system 200 according to an embodiment of the present invention. The system 200 may be implemented in software, hardware, and/or firmware. Those skilled in the art will appreciate that the various modules described in this disclosure are not limited to individual components but can be implemented in multiple components. For example, the architecture of the video matrix control system 200 may be implemented in multiple computing devices. In one embodiment, the system 200 may be stored in computer readable non-transitory media. For example, it may be partly stored in the computing device 40.

The system 200 includes a processing unit 2042, a memory 2044, a receiving module 202, a matrix switch module 204, a transmission module 206, and a streaming module 208. The receiving module 202, the matrix switch module 204, and the transmission module 206 are all coupled to the processing unit 2042 and controlled by it. The matrix switch module 204 is coupled between the receiving module 202 and the transmission module 206. The system 200 is coupled between multiple image sources 30 and multiple image output devices 50 (i.e. the video matrix display apparatus). In one embodiment, the receiving module 202 is stored in an image source 30, and the transmission module 206 is stored in an image output device 50, and the matrix switch module 204 is stored in the computer 40.

The receiving module 202 includes multiple first port interfaces (RX PHY) 2022 and a first transceiver element (FPGA) 2024. The multiple first port interfaces (RX PHY) 2022 are all coupled to the first transceiver element (FPGA) 2024. Each first port interface (RX PHY) 2022 respectively receives image data from an image source 30, converts it to a corresponding signal, and transmits the signal to the first transceiver element 2024.

In one embodiment, the first transceiver element 2024 of the receiving module 202 is coupled to the matrix switch module 204, and the receiving module 202 transmits signals to the matrix switch module 204 via the first transceiver element 2024.

In one embodiment, the transmission module 206 includes multiple second port interfaces (RX PHY) 2064 and a second transceiver element (FPGA) 2062. The second port interfaces 2064 are coupled to the second transceiver element 2062. The second transceiver element 2062 is coupled to the matrix switch module 204, to receive multiple signals. The second port interfaces 2064 convert the multiple signals to multiple original image data, and transmit them to the corresponding external display devices (i.e. image output devices 50).

The matrix switch module 204 includes a cross-exchange unit 2046. In one embodiment, the cross-exchange unit 2046 is a crosspoint switch. In one embodiment, the number of link (or line) pairs between the receiving module 202 and the matrix switch module 204 is M, and the number of link (or line) pairs between the transmission module 206 and the matrix switch module 204 is N, where N is greater than M. In one embodiment, the number of link (or line) pairs between the first transceiver element 2024 and the matrix switch module 204 is M, and the number of link (or line) pairs between the second transceiver element 2062 and the matrix switch module 204 is N, where N is greater than M. The values of M and N are not limited to the above example, but can be adjusted based on practical need, so long as the values of N and M meet the condition that N is greater than M. For clarity of the drawings and to avoid overcrowding, FIG. 3 does not illustrate the link (or line) pairs between the receiving module 202, the matrix switch module 204 and the transmission module 206 of the system 200, but the link pair configuration can be understood by referring to FIG. 2. It should be understood that the ratio of N/M is not limited to eight, and can be adjusted based on the number of components within the modules. In the system 200, the links or lines may include wired connections, wireless connections or their combination.

The port interfaces described in this disclosure include physical ports and their transmission interfaces. They must match the interfaces of the image sources 30. For example, if an image source 30 uses HDMI interface to transmit signals, then the corresponding port interface of the device 100 or system 200 should use HDMI interface and the physical port should use HDMI connectors. The transceiver elements described in this disclosure may include field-programmable gate array (FPGA) or other circuits that can be repeatedly reconfigured, to allow operators to program them based on practical need.

From the above descriptions, it can be seen that compared to conventional technology, the system architecture according to embodiments of the present invention can greatly reduce the number of components, simplify wiring configuration, and can support cross-screen PIP in TV wall mode, expanding the application of the video matrix control device.

The descriptions above are provided for explanatory purposes, and the various specific details are provided for a thorough understanding of the invention. Those skilled in the relevant art will be able to implement this invention without certain specific details. In other embodiment, some well-known structures and devices are not shown in the block diagrams. Between various elements shown in the drawings, intermediate structures may be present. The various described elements may include additional inputs and outputs, even though they are not shown in detail in the drawings.

In the various embodiments, certain elements are shown as separate circuits, but some or all elements may be integrated into one circuit. Thus, each of the various elements recited in the appended claims may correspond to one or more circuits.

Embodiments of the present invention include various processing programs, which may be embedded in hard drives or other computer readable memory and executed by processors. The processors may be general or special purpose processors or logic circuit that can execute program instructions, which execute the programs. The various components of the embodiments may also be combinations of hardware and software. The various modules, devices, or assemblies describe here may include hardware, software or their combinations. The modules described in the embodiments may include software, software data, commands and/or configurations, and can be implemented by the described mechanisms, electronics and hardware. Other aspects of the present invention provide computer program products, including a computer usable non-transitory medium having a computer readable program code embedded therein, where the program can be executed by processors or other electronic components to perform the methods described above. The computer usable non-transitory medium may include, without limitation, magnetic disks, optical discs, CD-ROMs, ROMs, RAMs, EPROMs, EEPROMs, magnetic memory, optical card, flash memory, or other computer usable medium suitable for writing and reading programs. Further, the computer program products according to embodiments of the present invention may also be downloadable programs which may be transmitted from a remote computer to a specified computer.

In the various methods described above, steps or information may be added or removed without departing from the spirit of the invention. Those skilled in the art can further improve the various embodiments. The embodiments described above are for explanation only and are not limiting.

In the above descriptions, when it is said that "component A is connected (or coupled) to component B", component A may be directly connected (or coupled) to B, or indirectly connected (or coupled) to B via component C. When it is said that a component, characteristics, structure, process or property A causes a component, characteristics, structure, process or property B, it is meant that A is at least a part of the cause of B, and other component, characteristics, structure, process or property may also help to cause B. When the word "may" is used, the component, characteristics, structure, process or property is not limited to what is described. Further, the number of various items describes in the specification is not limited to one.

It will be apparent to those skilled in the art that various modification and variations can be made in the apparatus and related methods of the present invention without departing from the spirit or scope of the invention. Thus, it is intended that the present invention cover modifications and variations that come within the scope of the appended claims and their equivalents.

What is claimed is:

1. A video matrix control device, comprising:
   a plurality of receiving modules, each receiving module including:

a plurality of first port interfaces, each configured to receive an image data and convert it to a corresponding signal, the signal being one of a transition-minimized differential signaling (TMDS) format signal, a low-voltage differential signaling (LVDS) format signal, a serializer/deserializer (SerDes) format signal, a transistor-to-transistor logic (TTL) format signal, and a mobile high-definition link (MHL) format signal; and a first transceiver element which is a field-programmable gate array (FPGA), coupled to the plurality of first port interfaces, wherein the signals from the plurality of first port interfaces are transmitted to the first transceiver element;

a matrix switch module having a cross-switch unit, the cross-switch unit being one of a crosspoint switch, an FPGA, or shunts combined with a switch, wherein the first transceiver elements of the plurality of receiving modules are coupled to the matrix switch module, and the signals are transmitted to the matrix switch module via the first transceiver elements;

a plurality of transmission modules, coupled to the matrix switch module, each transmission module including:

a second transceiver element which is an FPGA, coupled to the matrix switch module, configured to receive a plurality of the signals;

a plurality of second port interfaces, coupled to the second transceiver element, each second port interface configured to convert a respective one of the signals to a corresponding image data, and to transmit the image data to a corresponding external display device;

a first number (M) of link pairs between each first transceiver element and the matrix switch module, wherein each one of the first number of link pairs is configured to fully transmit multiple signals, each signal being one of a TMDS, LVDS, SerDes, TTL, and MHL format signals; and a second number (N) of link pairs between each second transceiver element and the matrix switch module, wherein each one of the second number of link pairs is configured to fully transmit a signal which is one of a TMDS, LVDS, SerDes, TTL, and MHL format signals, and wherein N is greater than M, wherein a total number of all first port interfaces of all receiving modules equal a total number of number of all second port interfaces of all transmission modules, and wherein the image data from each one of the first port interfaces is transmitted to a corresponding one of the second port interfaces via one of the first transceiver elements, the matrix switch module and one of the second transceiver elements.

2. The video matrix control device of claim 1, further comprising:

a streaming module comprising software and hardware, coupled to the transmission modules and the matrix switch module, for capturing images from the transmission modules.

3. The video matrix control device of claim 2, wherein the streaming module is configured to be coupled to a computer for displaying the captured images on a display of the computer.

4. The video matrix control device of claim 1, wherein N/M=8.

5. A video matrix control device, comprising:

a receiving module, including:

a first port interface, configured to receive an image data and convert it to a corresponding signal, the signal being one of a transition-minimized differential signaling (TMDS) format signal, a low-voltage differential signaling (LVDS) format signal, a serializer/deserializer (SerDes) format signal, a transistor-to-transistor logic (TTL) format signal, and a mobile high-definition link (MHL) format signal; and a first transceiver element which is a field-programmable gate array (FPGA), coupled to the first port interface, wherein the signal from the first port interface is transmitted to the first transceiver element;

a matrix switch module having a cross-switch unit the cross-switch unit being one of a crosspoint switch, an FPGA, or shunts combined with a switch, wherein the first transceiver element of the receiving module is coupled to the matrix switch module, and the signal is transmitted to the matrix switch module via the first transceiver element;

a transmission module, coupled to the matrix switch module, the transmission module including:

a second transceiver element which is an FPGA, coupled to the matrix switch module, configured to receive the signal; and a second port interface, coupled to the second transceiver element, the second port interface configured to convert the signal to a corresponding image data, and to transmit the image data to an external display device;

a first number (M) of link pairs between the first transceiver element and the matrix switch module, wherein each one of the first number of link pairs is configured to fully transmit multiple signals, each signal being one of a TMDS, LVDS, SerDes, TTL, and MHL format signals; and a second number (N) of link pairs between the second transceiver element and the matrix switch module, wherein each one of the second number of link pairs is configured to fully transmit a signal which is one of a TMDS, LVDS, SerDes, TTL, and MHL format signals, and wherein N is greater than M, wherein a total number of all first non interfaces of all receiving modules equal a total number of number of all second port interfaces of all transmission modules, and wherein the image data from each one of the first port interfaces is transmitted to a corresponding one of the second port interfaces via one of the first transceiver elements, the matrix switch module and one of the second transceiver elements.

6. The video matrix control device of claim 5, further comprising:

a streaming module comprising software and hardware, coupled to the transmission module and the matrix switch module, for capturing images from the transmission modules.

7. The video matrix control device of claim 6, wherein the streaming module is configured to be coupled to a computer for displaying the captured images on a display of the computer.

8. The video matrix control device of claim 5, wherein N/M=8.

9. A video matrix control system, comprising:
a processor;
a memory;
a receiving module, including:
- a plurality of first port interfaces, each configured to receive an image data and convert it to a corresponding signal, the signal being one of a transition-minimized differential signaling (TMDS) format signal, a low-voltage differential signaling (LVDS) format signal, a serializer/deserializer (SerDes) format signal, a transistor-to-transistor logic (TTL) format signal, and a mobile high-definition link (MHL) format signal; and
- a first transceiver element which is a field-programmable gate array (FPGA), coupled to the plurality of first port interfaces, wherein the signal from the first port interface is transmitted to the first transceiver element;

a matrix switch module having a cross-switch unit, the cross-switch unit being one of a crosspoint switch, an FPGA, or shunts combined with a switch, wherein the first transceiver element of the receiving module is coupled to the matrix switch module, and the signal is transmitted to the matrix switch module via the first transceiver element;
a transmission module, coupled to the matrix switch module, the transmission module including:
- a second transceiver element which is an FPGA, coupled to the matrix switch module, configured to receive the signal; and
- a plurality of second port interfaces, each coupled to the second transceiver element, each second port interface configured to convert a corresponding one of the signal to a corresponding image data, and to transmit the image data to an external display device;

wherein the receiving module, the matrix switch module and the transmission module are coupled to the processor,
wherein the matrix switch module is coupled between the receiving module and the transmission module,
a tin number (M) of link pairs between the first receiving module and the matrix switch module, wherein each one of the first number of link pairs is configured to fully transmit multiple signals, each signal being one of a TMDS, LVDS, SerDes, TTL, and MHL format signals; and
a second number (N) of link pairs between the second receiving module and the matrix switch module, wherein each one of the second number of link pairs is configured to fully transmit a signal which is one of a TMDS, LVDS, SerDes, TTL, and MHL format signals, and wherein N is greater than M,
wherein a total number of all first port interfaces of all receiving modules equal a total number of number of all second port interfaces of all transmission modules, and wherein the image data from each one of the first port interfaces is transmitted to a corresponding one of the second port interfaces via one of the first transceiver elements, the matrix switch module and one of the second transceiver elements.

10. The video matrix control system of claim 9, further comprising:
a streaming module comprising software and hardware, coupled to the transmission module and the matrix switch module, for capturing images from the transmission modules.

11. The video matrix control system of claim 10, wherein the streaming module is configured to be coupled to a computer for displaying the captured images on a display of the computer.

12. The video matrix control system of claim 9, wherein N/M=8.

* * * * *